United States Patent
Okayasu

(10) Patent No.: US 11,025,149 B2
(45) Date of Patent: Jun. 1, 2021

(54) LINEAR VIBRATION MOTOR AND ELECTRONIC DEVICE

(71) Applicant: NIDEC COPAL CORPORATION, Tokyo (JP)

(72) Inventor: Shinsuke Okayasu, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 82 days.

(21) Appl. No.: 16/412,597

(22) Filed: May 15, 2019

(65) Prior Publication Data

US 2019/0356208 A1    Nov. 21, 2019

(30) Foreign Application Priority Data

May 16, 2018   (JP) .................................. 2018-094674

(51) Int. Cl.
| | | |
|---|---|---|
| *H02K 33/14* | (2006.01) | |
| *H02K 33/00* | (2006.01) | |
| *B06B 1/04* | (2006.01) | |
| *H02K 41/035* | (2006.01) | |
| *H02K 33/12* | (2006.01) | |

(52) U.S. Cl.
CPC ............. *H02K 33/14* (2013.01); *B06B 1/045* (2013.01); *H02K 33/12* (2013.01); *H02K 41/0356* (2013.01)

(58) Field of Classification Search
CPC .......... H02K 1/06; H02K 33/00; H02K 33/02; H02K 33/04; H02K 33/14; H02K 33/16; H02K 33/12; B06B 1/04; B06B 1/045
See application file for complete search history.

(56) References Cited

U.S. PATENT DOCUMENTS

| | | | | |
|---|---|---|---|---|
| 9,614,425 B2* | 4/2017 | Jin | ......................... | H02K 33/12 |
| 2014/0346901 A1* | 11/2014 | Hayward | ............... | H02K 15/06 |
| | | | | 310/25 |
| 2017/0012515 A1* | 1/2017 | Xu | ......................... | H02K 33/16 |
| 2018/0021812 A1* | 1/2018 | Akanuma | ............. | H02K 33/02 |
| | | | | 310/25 |
| 2018/0166965 A1* | 6/2018 | Mao | ....................... | H02K 33/16 |

OTHER PUBLICATIONS

J.Choi et al. ("Design of a Halbach Magnet Array Based on Optimization Techniques", IEEE Transactions on Magnetics, vol. 44, No. 10, Oct. 2008 (Year: 2008).*

* cited by examiner

*Primary Examiner* — Burtin S Mullins
(74) *Attorney, Agent, or Firm* — Troutman Pepper Hamilton Sanders LLP

(57) ABSTRACT

A linear vibration motor comprising a movable element, having an integrated magnet, and a coil wherein winding parts and are caused to cross lines of magnetic force M1 and M2 of the magnet, where the coil is near to the movable element, and wherein the movable element is caused to vibrate along an axial direction through application of power to the coil, wherein: in the magnet, the direction of magnetization is aligned with the axial direction, and the magnet has two magnet pieces and, lined up in a direction that crosses the axial direction, and that have magnetic poles in mutually opposing directions; and other magnet pieces and, having magnetic poles that are magnetized in a crossing direction, where magnetic poles are in contact with, or near to, the identical magnetic poles of the two opposing magnetic poles on the same end sides of the two magnet pieces.

3 Claims, 6 Drawing Sheets

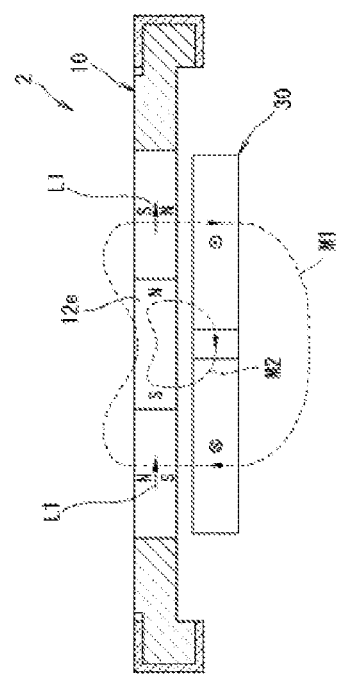
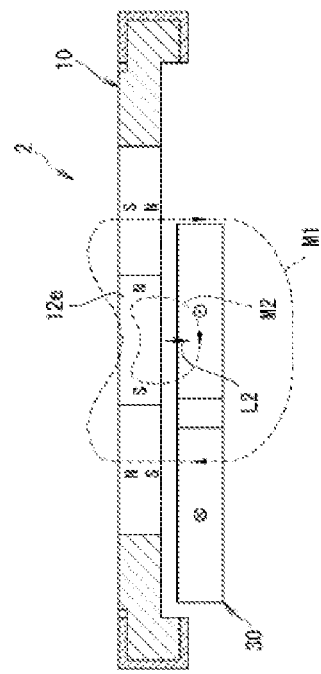
FIG. 6(A)
FIG. 6(B)

LINEAR VIBRATION MOTOR AND ELECTRONIC DEVICE

CROSS-REFERENCE TO RELATED APPLICATION

This application claims priority to Japanese Patent Application No. 2018-094674 filed May 16, 2018. This application is incorporated herein by reference in its entirety.

FIELD OF TECHNOLOGY

The present invention relates to a linear vibration motor and to an electronic device equipped with this linear vibration motor.

BACKGROUND

Vibration motors (or "vibration actuators") are built into mobile electronic devices, and are broadly used as devices to communicate to the user, through a vibration, that there is an incoming call, or that a signal, such as an alarm, or the like, has been generated, and have become indispensable devices in wearable devices, which are carried on the body of the user. Moreover, in recent years vibration motors have been of interest as devices by which to achieve haptics (skin-sensed feedback) in the human interfaces such as touch panels.

Among the various forms of vibration motors of this type that are under development, there is interest in linear vibration motors that are able to generate relatively large vibrations through linear reciprocating vibrations of a movable element. A linear motor is provided with a weight and a magnet on a movable element side, where an electric current is applied to a coil that is provided on the stator side to cause the Lorentz forces that act on the magnet to form a driving force, to cause the movable element, to undergo reciprocating vibrations in the axial direction.

In such a conventional linear vibration motor, as described in Japanese Unexamined Patent Application Publication 2014-23238, for example, the thrust on the movable element is increased through producing a relatively large magnetic field through biasing the movable element in one direction in the direction of thickness through configuring the magnets on the movable element side in a Halbach array.

SUMMARY

However, in the prior art set forth above, the magnetic field is produced biased toward one side of the movable element, in the thickness direction, and thus, depending on the positional relationship between the vibrating movable element and the coil, the Lorentz forces, which are biased toward one side in the thickness direction, act on the magnet, to deflect the movable element in the thickness direction, which bears the risk of becoming a factor that produces noise.

In order to solve such a problem, the present invention is provided with the following structures: a linear vibration motor comprising a movable element, having an integrated magnet, and a coil wherein a winding part is caused to cross a line of magnetic force of the magnet, where the coil is near to the movable element, and wherein the movable element is caused to vibrate along an axial direction through application of power to the coil, wherein: in the magnet, the direction of magnetization is aligned with the axial direction, and the magnet has: two magnet pieces, lined up in a direction that crosses the axial direction, and that have magnetic poles in mutually opposing directions; and another magnet piece, having a magnetic pole that is magnetized in a crossing direction, where magnetic poles are in contact with, or near to, the identical magnetic poles of the two opposing magnetic poles on the same end sides of the two magnet pieces.

BRIEF DESCRIPTIONS OF THE DRAWINGS

FIG. 6(A) is cross-sectional drawings critical portions of a linear vibration motor of a reference example illustrating the state wherein the movable element is in the initial position.

FIG. 6(B) is cross-sectional drawings critical portions of a linear vibration motor of a reference example illustrates the state wherein the movable element has moved to one side.

DETAILED DESCRIPTION

Figure 1:
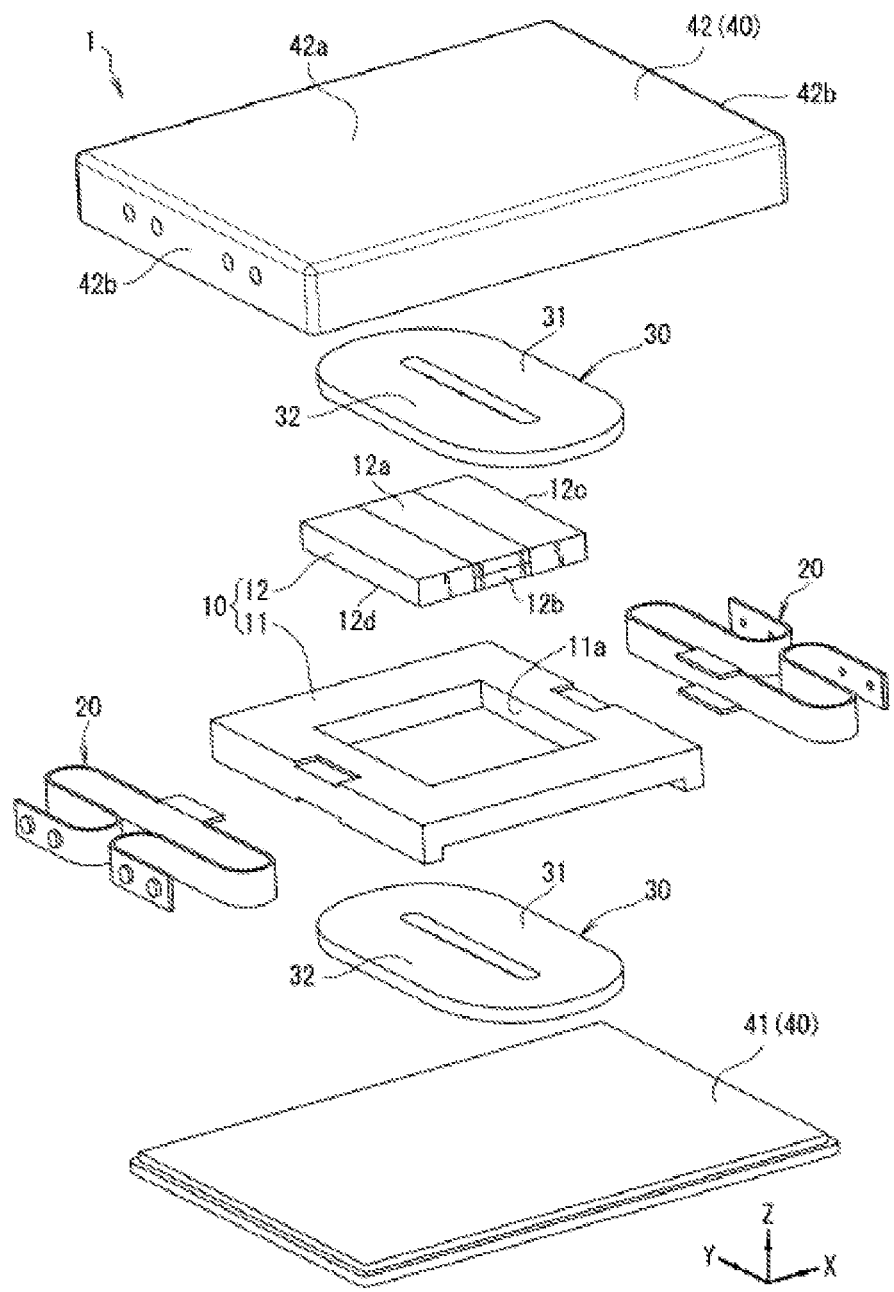
FIG. 1 is an exploded perspective diagram illustrating a linear vibration motor according to the present invention.

Embodiments according to the present invention will be explained below in reference to the drawings. In the descriptions below, identical reference symbols in the different drawings below indicate positions with identical functions, and redundant explanations in the various drawings are omitted as appropriate.

The linear vibration motor 1, as illustrated in FIG. 1 through FIG. 4, comprises: a movable element 10 that has an integrated magnet 12; an elastic member 20 for supporting the movable element 10 so as to enable vibration; a coil 30 wherein winding parts 31 cross lines of magnetic force M1 and M2 the magnet 12, and is near to the movable element 10; and a case 40, for containing and securing the elastic member 20 and the coil 30 therein, wherein: AC electric power is applied to the coil 30 to cause the movable element 10 to vibrate along the axial direction (the X axial direction in the figure).

The movable element 10 is equipped with an integrated weight 11 and magnet 12, and is supported, so as to enable vibration, by two elastic members 20, described below.

The weight 11 is formed from a metal material (for example, tungsten) that has a high specific gravity, formed in a shape that, in the plan view, is a frame, having a through hole 11a that the center. The through hole 11a is a rectangular hole that passes through the movable element 10 the thickness direction, and fits and secures the magnet 12.

Figure 2:
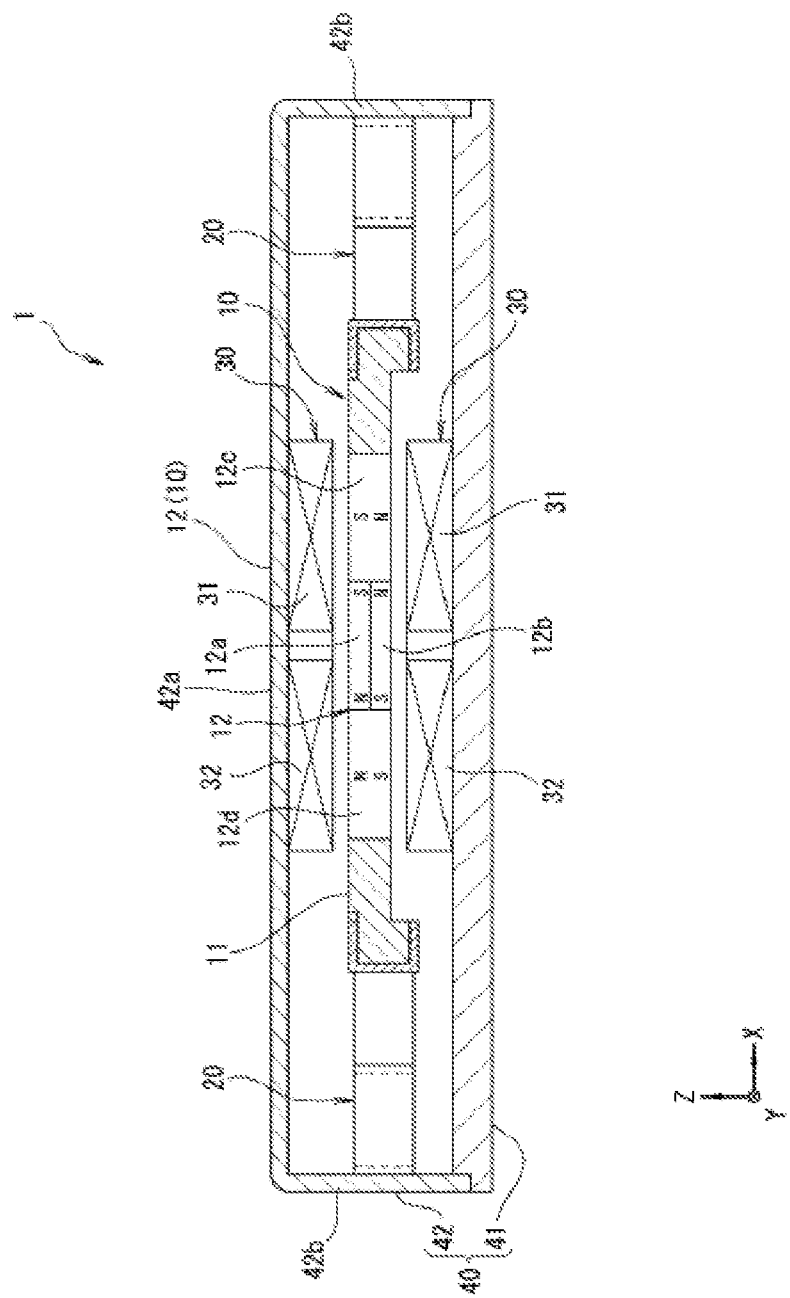
FIG. 2 is a cross-sectional diagram wherein the linear vibration motor is cut at the center in the short direction.
Figure 3:
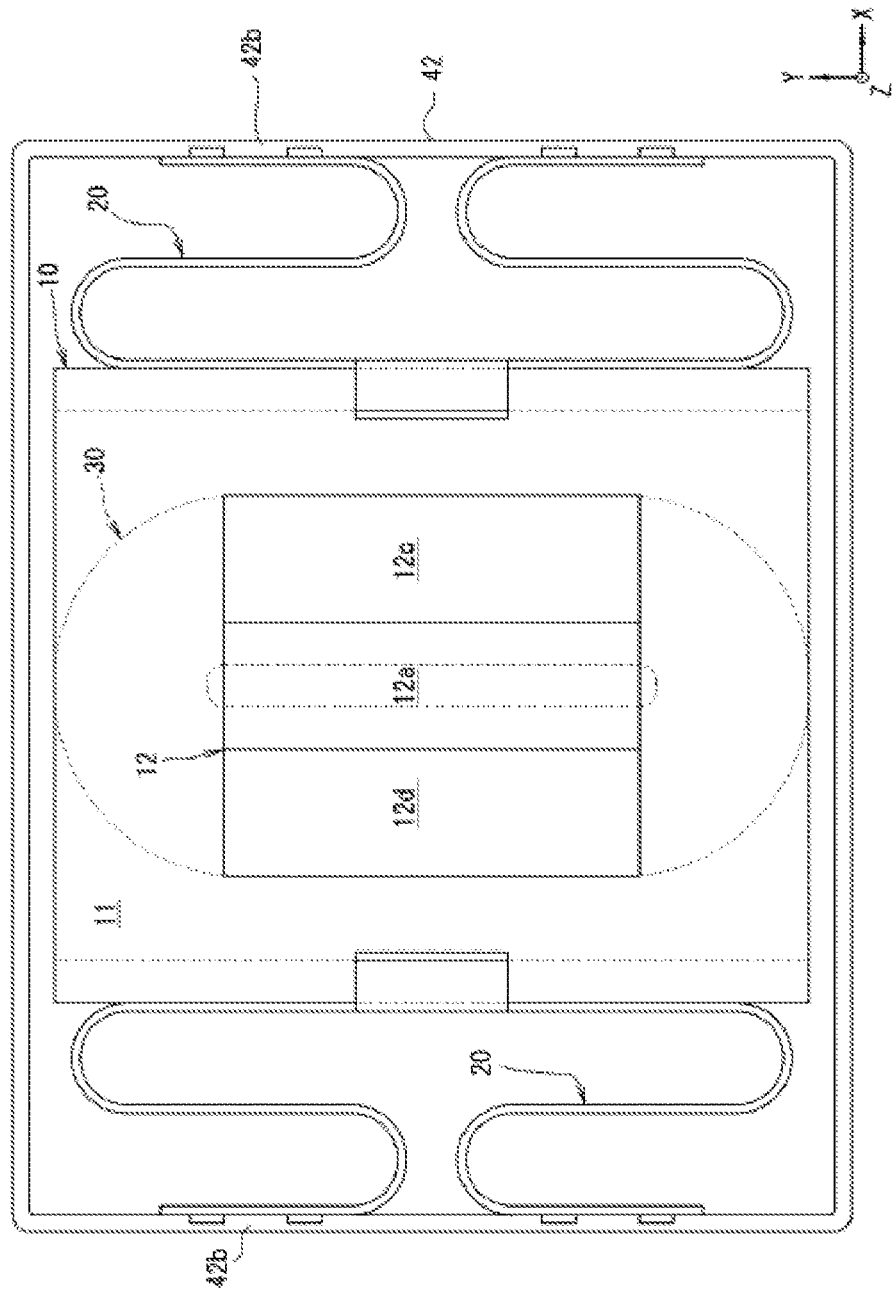
FIG. 3 is a plan view of the linear vibration motor in a state wherein the cover portion and the coil on the cover portion side are omitted.

As illustrated in FIG. 1 and FIG. 2, the magnet 12 has the magnetization direction thereof aligned with the axial direction (the X axial direction), and comprises: two magnet pieces 12a and 12b, which are lined up in the direction of thickness of the movable element (the Z axial direction), which is perpendicular to the aforementioned axial direction, and which have magnetic poles in mutually opposite directions; another magnet piece 12c, with both end side part thereof, which act as south and north poles, in contact with these same two opposing magnetic poles S and N at one end side, in the axial direction, of these two magnet pieces 12a and 12b; and another magnet piece 12d, wherein both end side parts that act as magnetic poles (the north pole and the south pole) are in contact with the two mutually opposing magnetic poles N, S at the other end sides, in the axial direction, of the two magnet pieces 12a and 12b.

In other words, these two magnet pieces 12c and 12d are provided so as to hold therebetween, from both sides, the two magnet pieces 12a and 12b that are stacked in the direction of thickness of the movable element, and the directions of the magnetic poles are in mutually opposite directions. Additionally, in these other two magnetic pieces 12c and 12d as well, the directions of the magnetic poles are in mutually opposing directions. Individual magnetic piece 12c (or 12d) is in contact with the side faces, on both end sides that serve as poles, with the same magnetic poles (of the south pole and north pole, or the north pole and south pole) in the two magnet pieces 12a and 12b. Consequently, in this magnet 12, Halbach arrays are arranged in two layers, on the one side and the other side in the direction of thickness of the movable element.

Two elastic members 20 are provided, so as to be positioned on both sides, in the direction of vibration, of the movable element 10.

Each elastic member 20 is a leaf spring made out of metal, with one end side, in the elastic repulsion direction, connected to the movable element 10, and the other end side connected to an inner surface of a side wall of the case 40, to support, and repel along the axial direction (the X axial direction), the movable element 10.

As other examples of the elastic member 20, they may be, for example, leaf springs of shapes other than those in the example illustrations, coil springs, or the like.

The two coils 30 are arranged so as to be positioned on both sides in the direction of thickness of the movable element (the Z axial direction), which is perpendicular to the direction of rotation of the movable element 10, with prescribed clearances secured between the movable element 10 and each.

In each coil 30, a coated wire is wrapped, in a flat hollow-core shape, along the X axial direction, with one end face thereof facing the magnet 12, and the other end face thereof secured to the inner surface of the case 40.

Additionally, each coil 30 has, on one side and the other side in the direction of vibration of the movable element (the X axial direction), winding parts 31 and 32 wherein the directions a1 and a2 of the electric currents are in mutually opposing directions. The winding parts 31 and 32 at least two locations face, respectively, the two magnet pieces 12c and 12d, which are on both sides.

Figures 4A, 4B:
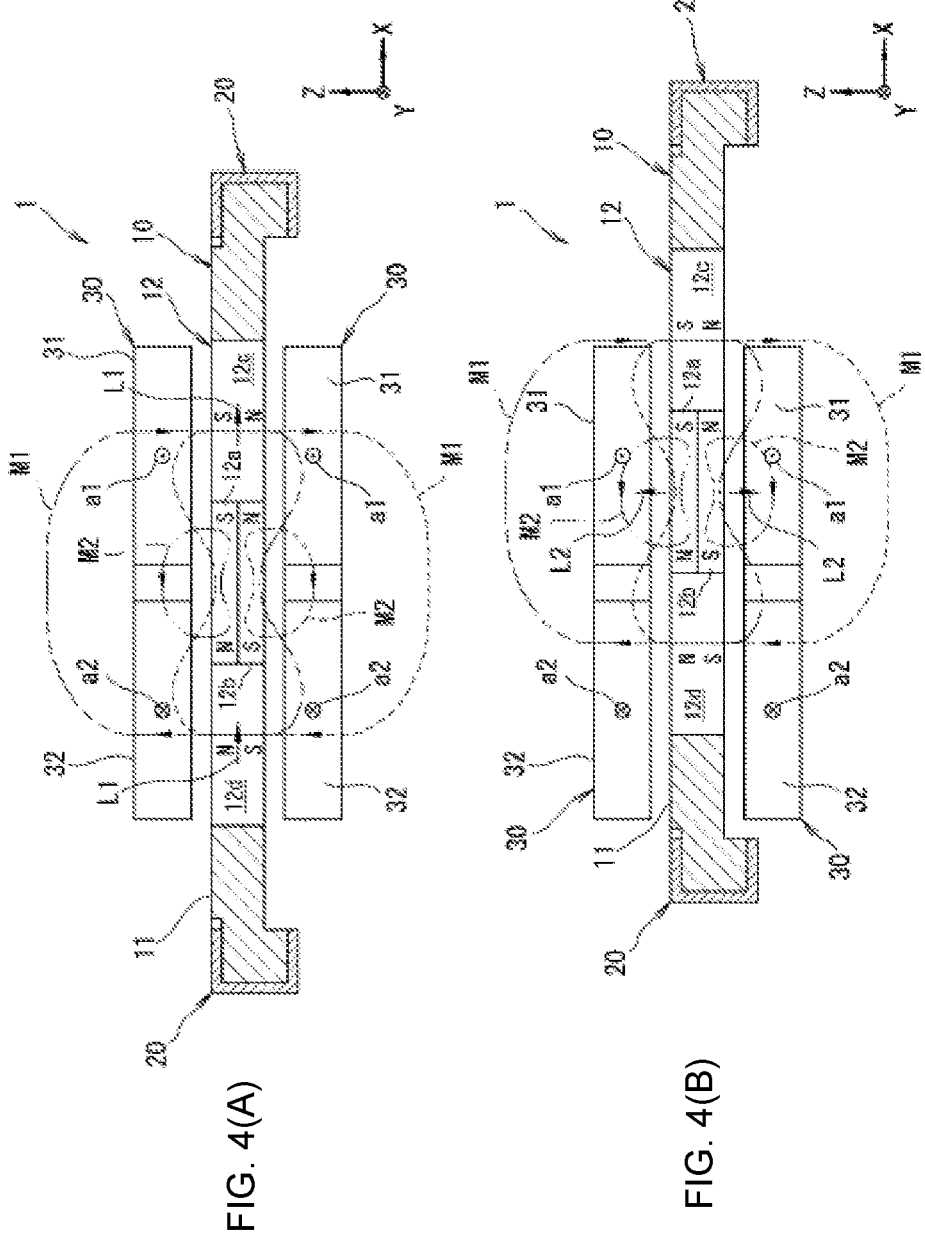
FIG. 4(A) is cross-sectional drawings critical portions of the linear vibration motor, sectioned at the center in the short direction, illustrating the state wherein the movable element is in the initial position.
FIG. 4(B) is cross-sectional drawings critical portions of the linear vibration motor, sectioned at the center in the short direction illustrating the state wherein the movable element has moved to one side.

Moreover, as illustrated in FIGS. 4(A) and 4(B), in the one winding part 31 (or 32) of the coil 30 (on the top side in the figure), and the other winding part 31 (or 32) of the coil 30 (on the bottom side in the figure), having the magnet piece 12c (or 12d) placed therebetween, the directions a1 and a1 (or a2 and a2) of the electric currents thereof are in the same directions.

Note that the means for causing the directions of the electric currents to be the same may use a well-known technology, such as through setting the coiling directions for each of the coils 30, adjusting the electric power that is supplied, or the like.

The case 40, in the example that is illustrated, is structured in a hollow box-shape wherein the top side of a rectangular flat plate-shaped base portion 41 is covered with a flat box-shaped cover portion 42 that is open toward the bottom. The base portion 41 has one of the coils 30 secured to the top face thereof. Moreover, the cover portion 42 has the other coil 30 secured to the inner surface of the top wall portion 42a thereof, and also supports elastic members 20 and 20 on respective inner surfaces of sidewall portions 42b and 42b on two sides in the X axial direction.

The operating effects that are the distinctive feature of the linear vibration motor 1 with the structure set forth above will be explained in detail next.

FIGS. 4(A) and (B) depicted schematically the operations when the linear vibration motor 1 moves in one direction accompanying vibration.

First, in the initial state wherein no power is applied to the two coils 30 and 30, the movable element 10 stands motionless, biased essentially uniformly by the elastic members 20 and 20 on both sides thereof.

When, in this initial state, AC electric power is applied to the two coils 30 and 30, the magnetic effects between the two coils 30 and 30 and the magnet 12 cause the movable element 10 to vibrate reciprocatingly.

Explaining in detail, fundamentally lines of magnetic force M1 in the direction of thickness of the movable element (the Z axial direction), and lines of magnetic force M2 in the direction of vibration of the movable element (the X axial direction) are formed around the magnet 12 (referencing FIGS. 4(A) and 4(B)).

Because of this, when current flows in one direction in the two coils 30 and 30, and the lines of magnetic force M1 cross the directions a1 and a2 of the currents in the winding parts 31 and 32 the individual coils 30, Lorentz forces L1 in one direction along the X axial direction in the figure are produced in the magnet 12. Moreover, when the lines of magnetic force M2 cross the directions a1 and a2 of the current, Lorentz forces L2 and L2 are produced in the magnet 12 in opposing directions along the Z axial direction in the figure. Consequently, these Lorentz forces L2 and L2, in opposite directions, cancel each other out, so that the movable element 10 moves in the X axial direction, affected primarily by the Lorentz forces L1.

Through this, when AC electric power is supplied continuously to the movable element 10, the movable element 10 vibrates smoothly in the X direction, in a state wherein deflection in the Z axial direction is suppressed.

That is, if, as in Reference Example 1, depicted in FIGS. 6(A) and 6(B), one of the two coils 30 were removed, and the two magnet pieces 12a and 12b were replaced with a single magnet 12e, the movable element 10 would be deflected in the Z axial direction during vibration, due to the effects of the Lorentz force L2 in the Z axial direction; however, the linear vibration motor 1, structured as described above, prevents this, enabling an improvement in quietness and durability.

Figure 5:
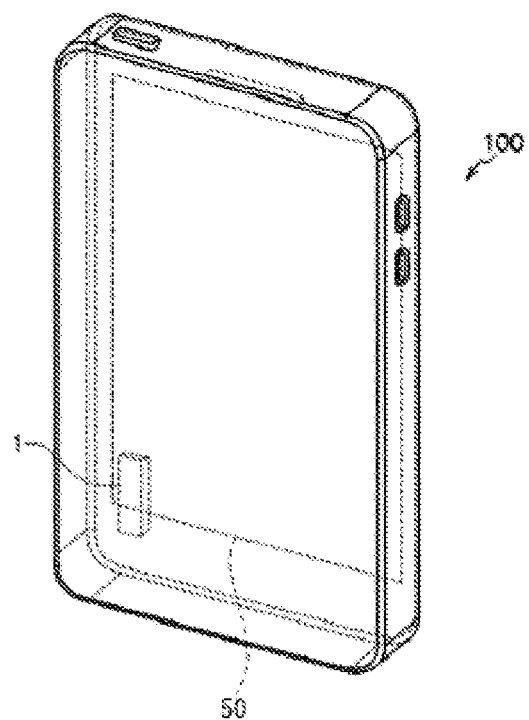
FIG. 5 is a perspective diagram depicting an example of an electronic device equipped with a linear vibration motor.

An electronic device equipped with the linear vibration motor 1 will be explained next. FIG. 5 depicts a mobile information terminal 100 as an electronic device equipped with a linear vibration motor 1 according to an embodiment according to the present invention.

The mobile information terminal 100 is structured so as to vibrate the linear vibration motor 1 in response to receiving an external signal, a touch operation from a touch operating panel 50 (that includes a touch display), or the like, and through the structure of the magnet 12, and the like, described above, enables effective reduction of noise during vibration of the linear vibration motor 1, and is superior in durability as well.

Note that, although, in the embodiment described above, in a particularly preferred form magnet pieces 12*c* and 12*d* are provided on both sides, in the direction of vibration, of the two magnet pieces 12*a* and 12*b*, as another example it is possible to omit one of these magnet pieces 12*c* (or 12*d*).

While embodiments according to the present invention were described in detail above, the specific structures thereof are not limited to these embodiments, but rather design variations within a range that does not deviate from the spirit and intent of the present invention are also included in the present invention. Moreover, insofar as there are no particular contradictions or problems in purposes or structures, or the like, the technologies of the various embodiments described above may be used together in combination.

What is claimed is:

1. A linear vibration motor comprising:
    a movable element, having an integrated magnet, and two coils configured to cause to cross a line of magnetic force of the magnet, where the coils are near to the movable element, and
    wherein the movable element is caused to vibrate along an axial direction through application of power to the coils,
    wherein the magnet comprises:
    a first magnet piece and a second magnet piece, lined up in a direction that crosses the axial direction, and that have magnetic poles in mutually opposing directions; and
    a third magnet piece and a fourth magnet piece, each having a magnetic pole that is magnetized in a crossing direction, where magnetic poles are in contact with, or near to, the identical magnetic poles of the two opposing magnetic poles on the same end sides of the first and second magnet pieces, wherein the third and fourth magnet pieces are disposed on opposite sides in the axial direction of the first and second magnet pieces,
    wherein the two coils have a first coil with a first winding part and a second coil with a second winding part,
    wherein directions of electric current on a first side and on a second side of the first winding part are in mutually opposing directions,
    wherein directions of electric current on a first side and on a second side of the second winding part are in mutually opposing directions,
    wherein the first side of the first winding part and the first side of the second winding part face the third magnet piece,
    wherein the second side of the first winding part and the second side of the second winding part face the fourth magnet piece,
    wherein the first side and the second side of the first winding part are separated by a first through hole disposed at a center of the first coil, wherein the first through hole faces the first magnet piece, and
    wherein the first side and the second side of the second winding part are separated by a second through hole disposed at a center of the second coil, wherein the second through hole faces the second magnet piece.

2. The linear vibration motor as set forth in claim 1, wherein: the first and second coils are disposed at opposite sides of the magnet in the crossing direction, where, for these two coils, the first winding part of the first coil and the second winding part of the second coil, which face each other on both sides in the crossing direction, have electric currents that are in the same direction.

3. An electronic device comprising a linear vibration motor as set forth in claim 1.

* * * * *